(No Model.)

W. S. OVENS.
PIE PLATE.

No. 247,576. Patented Sept. 27, 1881.

Witnesses.
Jos. Schenk
M. Pinner

Inventor.
Walter S. Ovens.
By James Sangster

UNITED STATES PATENT OFFICE.

WALTER S. OVENS, OF BUFFALO, NEW YORK, ASSIGNOR TO CHARLES E. BENEDICT AND GEORGE B. WEBSTER, OF SAME PLACE.

PIE-PLATE.

SPECIFICATION forming part of Letters Patent No. 247,576, dated September 27, 1881.

Application filed August 10, 1881. (No model.)

*To all whom it may concern:*

Be it known that I, WALTER S. OVENS, a citizen of the United States, residing in Buffalo, in the county of Erie and State of New York, have invented certain new and useful Improvements in Pie-Plates, of which the following is a specification.

The object of my invention is to provide the means for facilitating the manufacture of pies; and it consists of a pie-plate provided with an upwardly-projecting rim or cutting-edge, whereby the pie, after being placed in the dish or plate, may have its edge or circumference instantly and readily trimmed or cut true to the shape of the outer edge of the plate by passing a roller over it.

My invention further consists in the combination of said plate with a supporting-rim, as will be more clearly hereinafter shown by reference to the drawings, in which—

Figure 1:
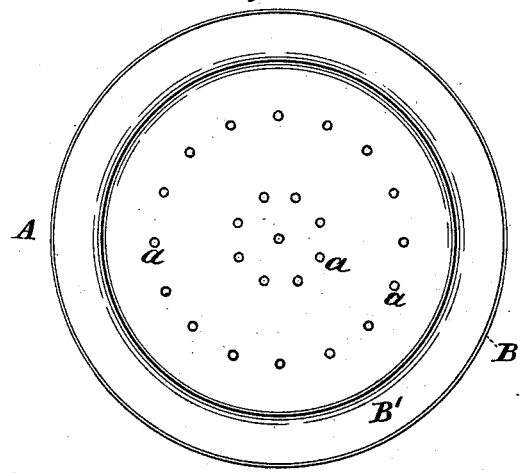
Figure 2:
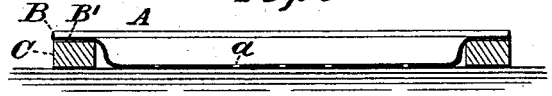
Figure 3:
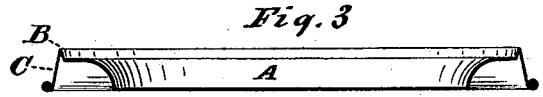
Figure 4:
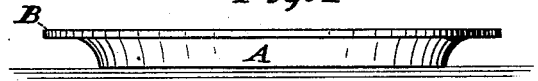

Figure 1 is a face view of the plate; Fig. 2, a vertical central section through Fig. 1 and through an edge-supporting ring. Fig. 3 represents a vertical central section through a plate having an edge-supporting ring formed in one piece with it. Fig. 4 is a side elevation of a plate, and Fig. 5 is a top view of a supporting-ring separate from the plate.

The plate A is provided with a series of perforations, a, at the bottom to allow sufficient ventilation while the pie is being baked.

B represents the upwardly-projecting rim or cutting-edge. It projects up far enough to allow for the thickness of the pie-crust on the portion B', and is sufficiently sharp to allow the dough to be cut away from the outer edge of the pie-plate by passing a roller over it.

Figure 5:
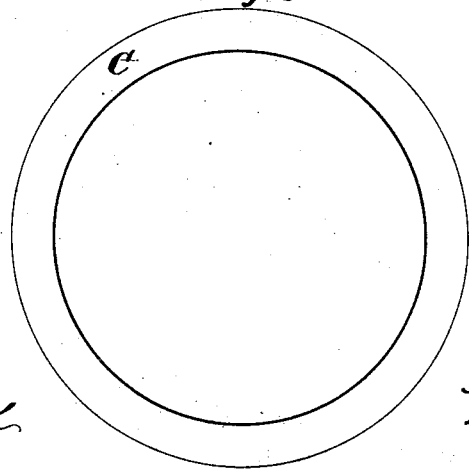

It is intended to use the plate in combination with a supporting-ring, C, either made in one piece with it, as shown in Fig. 3, or a separate ring, C, may be used, as shown in Fig. 2, also in Fig. 5, the object being to prevent the pie from tipping up while the roller is being passed over it.

The operation will be clearly understood from the foregoing description and accompanying drawings.

I claim as my invention—

1. A pie-plate provided with an upwardly-projecting cutting-edge, B, substantially as and for the purposes described.

2. A pie-plate provided with an upwardly-projecting cutting-edge, B, in combination with a supporting-ring, C, for the purposes specified.

WALTER S. OVENS.

Witnesses:
J. SANGSTER,
AMOS W. SANGSTER.